Patented Sept. 2, 1930

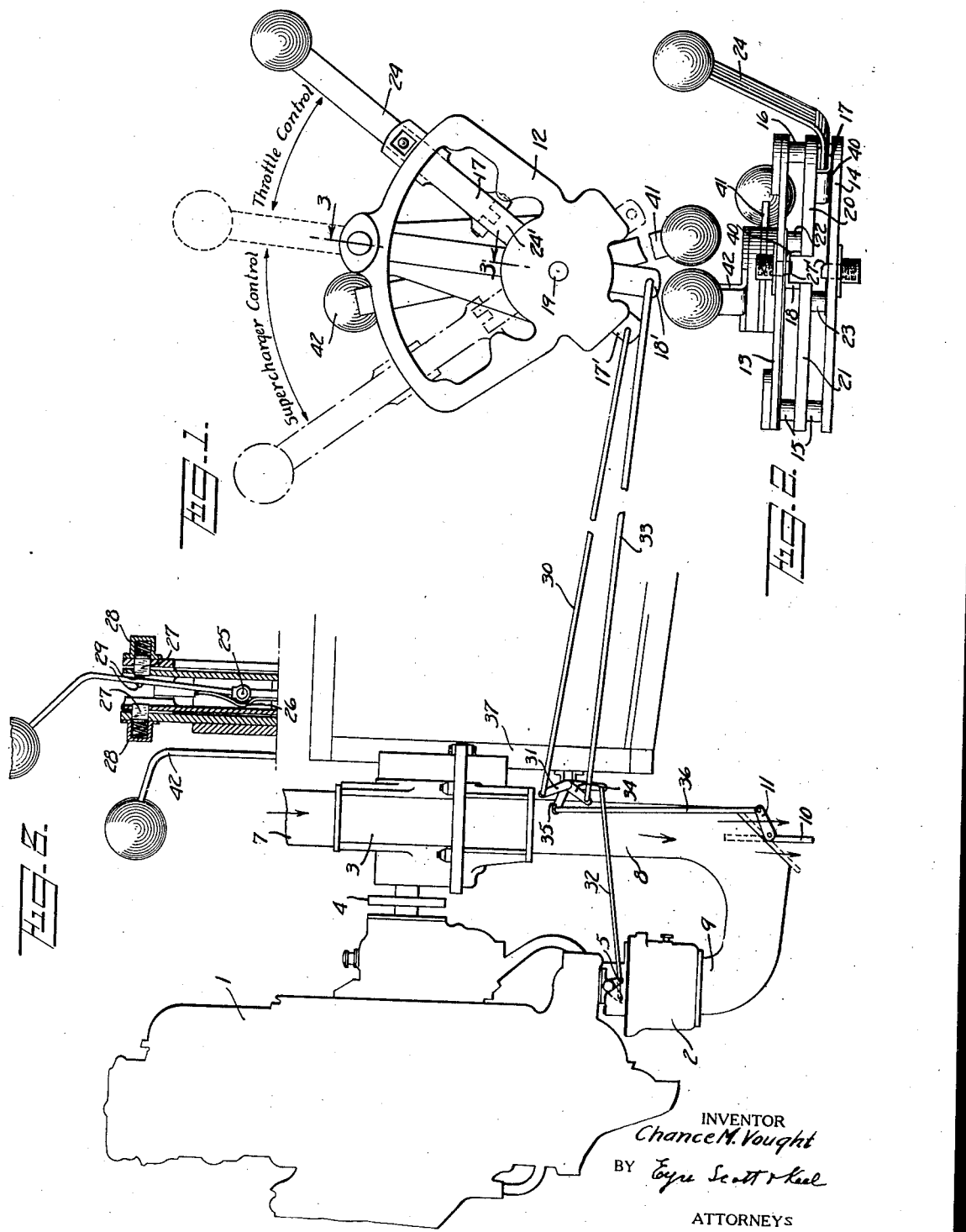

1,774,738

UNITED STATES PATENT OFFICE

CHANCE MILTON VOUGHT, OF GRENWOLDE, GREAT NECK, NEW YORK

POWER PLANT FOR AIRCRAFT AND CONTROL THEREOF

Application filed September 29, 1927. Serial No. 222,922.

The invention relates to power plants for aircraft and particularly to power plants including an internal combustion engine and a means for regulating and controlling the pressure on the carbureting devices and the engine. An example of a power plant of this type is an internal combustion engine combined with an air compressor or supercharger adapted to take in the atmospheric air and force it under pressure into the carbureting devices and the manifold of the engine. Power plants of this character have a special utility in applications to airplanes and aircraft generally which are designed for operations in the higher altitudes where the efficiency and power of the internal combustion engine are considerably impaired due to the rarefication of the atmosphere, the air compressor or supercharger being brought into operation to elevate the pressure supplied to the engine above the surrounding atmosphere in these higher altitudes. It is important to properly correlate the normal engine control with that of the supercharger control in order to obtain the maximum efficiency and perfect safety in the control of the craft and in particular it is desirable to utilize the usual carbureter controls for normally controlling the power and operation of the power plant to the exclusion of the compressor or supercharger unless and until the maximum power developed with the normal air pressure supply and the normal control of the carbureting devices is insufficient, the supercharger then being brought into operation to boost the pressure and the power. To this end I have devised a power plant for aircraft including, among other things, an internal combustion engine and carbureting fuel supply devices therefor, a supercharger or air compressor for boosting the air pressure upon the engine and a special control means enabling the operator to control the engine through the ordinary carbureting control for the normal control and drive of the craft and to ultimately bring into effective operation the compressor or supercharger to boost the pressure and power of the engine but only after the maximum of power is attained through the normal control of the carbureting and fuel supply devices. My invention also resides in a special novel means for effecting the normal and pressure booster controls, this means being characterized by simplicity in construction and operation and economy in manufacture.

For a better understanding of the invention, reference may be had to the accompanying drawings, wherein Fig. 1 is a side view, mostly diagrammatically, illustrating my invention as applied to a power plant, Fig. 2 is a plan view of a part of the control means, and Fig. 3 is a sectional view along the line 3, 3 of Fig. 2.

Referring to Fig. 1, I have illustrated my invention as applied to a power plant for airplanes and aircraft generally, including an internal combustion engine 1, carbureting devices 2, and a supercharger or air compressor 3 which is geared to be driven by the motor or engine 1 in any suitable manner, as for example, by means of the flexible coupling 4 diagrammatically indicated. The engine, carbureter and the supercharger may be of any suitable design and construction. For example, the engine may be a stationary cylinder or rotary cylinder engine. The supercharger 3 may be of any desired construction, as long as it is adapted to take in air from the atmosphere, compress it and supply it to the carbureters and manifold of the engine under increased pressure, and the carbureter indicated at 2 may be any suitable type of carburetor for use in connection with the supercharger and the particular engine of the plant. As one of the devices for controlling the carbureting devices, I have indicated a throttle operating member 5 and at 6 I have indicated a mixture control lever which is preferably operated independently of the throttle member 5. The supercharger 3 has an intake 7 and a discharge pipe 8, the latter extending vertically downward to a point below the level of the carbureting devices 2 and then formed into a U with its short leg 9 secured to the opening of the carbureter 2 to supply air thereto under pressure. The supercharger control includes an air valve 10 disposed in the outlet 8 of the supercharger, this valve being operable by a bell crank lever 11. The full line position of this valve corresponds to the open position wherein the compressor 3 simply takes air in at 7 and exhausts it again into the atmosphere without appreciably elevating the pressure thereof. The control for the throttle lever 5 of the carbureting devices and the valve 10 of the supercharger includes a stationary frame member 12 which may be secured to the aircraft frame or body in any suitable manner, this frame 12 including a pair of spaced segmental members 13 and 14, which members are rigidly secured together in any suitable manner and similarly spaced from each other in any suitable manner, as for example, by the spacing means 15 and 16. These spaced members 13 and 14 carry therebetween a pair of levers 17 and 18 which are pivotally arranged on the axis 19 of the frame 12, the lever 17 engaging the frame member 14 and the lever 18 engaging the frame member 13. Each of the levers 17 and 18 has its upper end formed into a U-shaped member whose legs bridge the gap between the member 13 (or 14) and the intermediate arcuate member 20 (or 21), these arcuate members 20 and 21 forming intermediate guideways for the levers 17 and 18 and preferably being of narrow width and rigidly fixed substantially midway between the members 13 and 14 by means of the spacing blocks 15 and 16 at their outer ends and by means of the spacing blocks 22 and 23 at their inner or adjacent ends. The levers 17 and 18 are actuated by a handle 24, the latter being in the form of an outer metallic strip adapted to fit into the U-shaped ends of the levers 17 and 18 and having an inner end 24' which is pivoted on the axis 19 and being in turn pivoted to the outer portion 24 upon an axis 25 at right angles to and removed from the axis 19. The handle 24 is adapted, therefore, to swing over into engagement with the levers 17 and 18 in the intermediate position or in the position where the shift from the carbureter control to the supercharger control, or vice versa, is effected. The intermediate arcuate guide sections 20 and 21 are spaced at their inner ends to permit the swinging over of the handle 24 to engagement with either the U-shaped lever 17 or the U-shaped lever 18. A spring 26 normally urges the lever 24 over in the direction towards the lever 17. The levers 17 and 18 are automatically locked in the intermediate position of the frame member 12 by means of the spring-pressed latches or plungers 27, the springs being contained within the little cylindrical containers 28 carried on the outer sides of the frame members 13 and 14, the plungers 27 registering and passing through openings provided in the levers 17 and 18, respectively. The handle 24 is provided with the bosses or projections 29 for engaging the locking plungers 27 and when lateral pressure is exerted upon the handle one or the other of the plungers 27 is urged out of locking engagement with the levers 17 and 18 against the tension of its spring. The edges of the plungers 27 are beveled off at 27' to enable them to be automatically urged into their recesses by the levers 17 and 18 as the latter are moved to and from locking position. The U-shaped parts of the levers 17 and 18 are formed with beveled off edges 40 on their inner edges which cooperate with the beveled off edges 27' on the plungers 27. The lower ends 17' and 18' of the levers 17 and 18 are connected respectively through a system of connecting links and levers to the throttle control 5 and the valve control 11 respectively. For example, a link 30 connects the lever 17' to a bell crank 31, the lower end of the bell crank lever 31 having a connecting length 32 leading to the throttle control 5. Similarly the lever 18' has a connecting link 33 leading to a bell crank 34, the other member of this bell crank 35 having a link 36 leading to the bell crank 11. The supercharger 3 and bell cranks 31, 34, 35 may be suitably supported upon a fire-wall 37.

The operation of the control of the power plant illustrated is as follows:

At starting, the handle 24 is in the position to the right indicated in Fig. 1. The handle 24 in this position engages the lever 17 and holds it in a position corresponding to closed or practically closed position of the throttle member 5. The handle 24 may be operated to control the throttle 5 and the power of the motor under normal operations, but the lever 18 cannot be operated to control the supercharger until the extreme forward position of the lever 17 in the throttle control slot is reached, which corresponds to the full open position of the throttle 5, the spacer 22 serving as a stop at the end of the throttle control slot to arrest the lever 17. If after the full open throttle position is reached the pilot finds that he has not sufficient power to ascend further or to drive the craft in the manner desired, he can then shift the handle 24 sidewise or laterally against the tension of the spring 26 and thereby simultaneously engage and unlock the lever 18 to actuate the supercharger air supply control. By doing so, however, the throttle lever 17 is locked in the full open position, so that the throttle 5 must be maintained in full open position while the handle 24 is in engagement with or is actuating the supercharger control 18. The pilot can by operating the handle 24 in the continuous manner indicated, gradually supply full supercharger air pressure supply to the carbureters 2, but only with the throttle wide open in all positions of the control 10. The craft may be caused, therefore, to gradually ascend to its highest level or ceiling, or increase its speed at a given altitude, and upon descending or decreasing its speed the pilot may gradually return the supercharger control 18 to its full open position against the spacer 23 as a stop or the end of the path of movement, whereupon further control for decrease of power is effected through the closing and manipulation of the throttle valve. It is observed that the handle 24 is automatically thrown over by spring 26 toward the lever 17 and against the lock 27 therefor immediately upon the handle 24 reaching the shift over position and the release thereof, and that the throttle control slot is therefore the normal position for the handle to be in, necessitating a special sidewise operation against spring 26 to bring the handle into the supercharger control slot. In the particular embodiment illustrated I have illustrated the movement of lever 24 for the throttle control of a substantially smaller angle than the corresponding control for the supercharger, in order to effect a particularly sensitive control of the supercharger with the particular gear ratios indicated.

I have indicated at 41 and 42 hand levers for controlling the mixture and spark adjustment respectively, the connections leading to the mixture valve and to the spark adjusting mechanism being omitted for convenience in illustration. The levers 41 and 42 are mounted for pivotal movement on the axis 19 and formed as a unit with the control members 17, 18 and 24. In the embodiment illustrated the mixture control and the spark control are effected independently of the supercharger control.

I claim:

1. A control unit for the purpose set forth including a frame having arcuate segmental guide members forming two parallel offset overlapping guide paths, the outer of said guide members carrying at the overlapping point of the guide paths separate and independent spring pressed locking plungers which project laterally into said paths, separate and independent control members pivotally mounted for movement within said guide paths, each of said control members having an opening for the reception of and being adapted, when actuated to the overlapping point, to automatically come into locking engagement with the plunger with the latter projecting through the opening, a single actuating member which is pivotally mounted as a whole for movement parallel to the movement of the control members and is provided with an upper part which is pivotally connected with the lower part for movement laterally from one guide path to the other into operative engagement with either of the control members and said upper part having formed on opposite sides thereof bosses which are adapted to engage the locking plungers and release the control members, and means for yieldingly urging the upper part of said actuating member laterally in one direction to normally engage when at the overlapping point of the paths one of said control members.

2. A control unit for the purpose set forth including a frame having arcuate segmental guide members forming two parallel offset overlapping guide paths, the outer of said guide members carrying at the overlapping point of the guide paths separate and independent locking devices, separate and independent control members pivotally mounted for movement within said guide paths, each of said control members being adapted, when actuated to the overlapping point, to automatically come into locking engagement with aid locking means, a single actuating member which is pivotally mounted as a whole for movement parallel to the movement of the control members and is provided with an upper part which is pivotally connected with the lower part for movement laterally from one guide path to the other into operative engagement with either of the control members and said upper part having means for engaging the locking devices and releasing the control members and means for yieldingly urging the upper part of said actuating member laterally in one direction to normally engage, when at the overlapping point of the paths, one of said control members.

3. A control unit for the purpose set forth including a frame having arcuate segmental guide members forming two parallel offset overlapping guide paths, the outer of said guide members carrying at the overlapping point of the guide paths separate and independent spring pressed locking plungers which project laterally into said paths, separate and independent control members pivotally mounted for movement within said guide paths, each of said control members having an opening for the reception of and being adapted, when actuated to the overlapping point, to automatically come into locking engagement with the plunger with the latter projecting through the opening, a single actuating member which is pivotally mounted as a whole for movement parallel to the movement of the control members but is adapted to assume a slight lateral movement into operative engagement with either of the control members when at the overlapping point, said actuating member being adapted to engage the locking plungers and release the control members.

4. A control unit for the purpose set forth including a frame having arcuate segmental guide members forming two parallel offset overlapping guide paths, the outer of said guide members carrying at the overlapping point of the guide paths separate and independent spring pressed locking plungers which project laterally into said paths, separate and independent control members pivotally mounted for movement within said guide paths, each of said control members having an opening for the reception of and being adapted, when actuated to the overlapping point, to automatically come into locking engagement with the plunger with the latter projecting through the opening, a single actuating member which is pivotally mounted as a whole for movement parallel to the movement of the control members but is adapted to assume a slight lateral movement into operative engagement with either of the control members when at the overlapping point, said actuating member being adapted to engage the locking plungers and release the control members, and means for yieldingly urging said actuating member laterally in one direction to normally engage, when at the overlapping point of the paths, one of said control members.

In testimony whereof, I have signed my name to this specification.

CHANCE M. VOUGHT.